US008799176B2

(12) United States Patent
Walker

(10) Patent No.: US 8,799,176 B2
(45) Date of Patent: *Aug. 5, 2014

(54) SYSTEM AND METHOD FOR EVALUATING OFFICE BUILDINGS FOR LEASING

(75) Inventor: Michael J. Walker, Glen Ellyn, IL (US)

(73) Assignee: SpaceLogik, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/012,554

(22) Filed: Feb. 4, 2008

(65) Prior Publication Data

US 2008/0249795 A1    Oct. 9, 2008

Related U.S. Application Data

(63) Continuation-in-part of application No. 11/287,124, filed on Nov. 22, 2005.

(51) Int. Cl.
*G06Q 50/16* (2012.01)
*G06Q 10/08* (2012.01)
*G06Q 90/00* (2006.01)
*G06Q 10/10* (2012.01)

(52) U.S. Cl.
CPC .............. *G06Q 10/087* (2013.01); *G06Q 50/16* (2013.01); *G06Q 90/00* (2013.01); *G06Q 10/10* (2013.01)

USPC .......................................................... 705/313

(58) Field of Classification Search
USPC .......................................................... 705/313
See application file for complete search history.

(56) References Cited

PUBLICATIONS

Thomsett, Michael; "Real estate investor's pocket calculator: simple ways to computer cash flow, value, return and other key financial measures" Oct. 2005; AMACOM.*

* cited by examiner

*Primary Examiner* — Traci Casler
(74) *Attorney, Agent, or Firm* — Michael Best & Friedrich LLP

(57) ABSTRACT

A system and method for calculating the amount of space that a user will be required to lease in various office buildings and providing a comparison so that the user can make educated decisions and pre-qualifications as to whether the building will be a viable leasing option for the user. In so doing, the system and method provide the user with relative values and target rental rates of the office buildings by considering the buildings' efficiency and corresponding amount of space the tenant will be required to lease. The calculated relative values and target rental rates may be used by tenants to evaluate building choices for leasing. The system may be configured on a network computer system or a standalone computer.

22 Claims, 10 Drawing Sheets

FIG. 4

Building Name:
Address:
Floor:
City:
Date Surveyed:
Surveyor:

|   | Landlord | Leasecorp |   |
|---|---|---|---|
| 1. What is the rentable square footage of the floorplate? | 24,000 | 23,621 | Diff: 379 |
| 2. What are the dimensions of the typical column (finished and squared)? | 27.00 by | 25.25 | inches |
| 3. Number of columns on each floor (in rentable area only): | | 22 | 104.16 |
| 4. Is the building a square/rectangle? | | Yes | |
| 5. If the building IS a square/rectangle, the dimensions are: | 198.25 by | 127.83 | feet |
| 6. If the building IS NOT a square/rectangle, how many sides are there? | 0 | Perimeter 652.17 | |

|   | Side 1 | Side 2 | Side 3 | Side 4 | Side 5 | Side 6 | Side 7 | Side 8 | Side 9 | Side 10 |
|---|---|---|---|---|---|---|---|---|---|---|
| Outside perimeter of dominant face | - | - | - | - | - | - | - | - | - | - |
| Number of duplicated sides | 1.0 | 1.0 | 1.0 | 1.0 | 1.0 | 1.0 | 1.0 | 1.0 | 1.0 | 1.0 |
| 7. Is building side an arc or angle?* | N/A | N/A | N/A | N/A | N/A | N/A | N/A | N/A | N/A | N/A |
| Theta | - | - | - | - | - | - | - | - | - | - |
| If an arc, radius | - | - | - | - | - | - | - | - | - | - |

*Workstation to Office ratio for angles and arcs is: 50.0% / 50.0%

Arc and Angle Losses: .................................................................................. [ - ]

8. Distance from dominant face to usable floor space: 5.25 inches

9. What percentage of the floor is encumbered (not including columns)? 100%   285.32

10. Unusual losses: ....................................................................................... 55.05

| | | | | |
|---|---|---|---|---|
| Corner columns | 4.43 | SF | 4 | duplicates |
| Interior columns | 4.00 | SF | 2 | duplicates |
| Water columns | 14.67 | SF | 2 | duplicates |

Building's net inefficiency: 3.4%   823.53

11. What is the building's single tenant loss factor (based on Landlord rsf)? 9.40%   2,256.00

12. What is the building's multi-tenant loss factor (based on Landlord rsf)? 12.77%   3,064.80

SINGLE TENANT INEFFICIENCY FACTOR: 13.2%

MULTI TENANT INEFFICIENCY FACTOR: 16.6%

FIG. 7

Building Name:
Address:
Floor:
City:
Date Surveyed:
Surveyor:

1. What is the rentable square footage of the floorplate as identified by landlord? `24,000`

2. Column Losses
   - Corner Columns `4.43` SF `2` duplicates
   - Interior Columns `4.00` SF `2` duplicates
   - Water Columns `14.67` SF `4` duplicates 3. Total of all column losses from section 2 above: `55.05` #1

4. Is the building a square/rectangle? `Yes`

5. If the building IS a square/rectangle, the dimensions are: `198.25` by `127.83` feet 6. If the building is NOT a square/rectangle, how many sides are there? `0` Perimeter `652.17`

| | Side 1 | Side 2 | Side 3 | Side 4 | Side 5 | Side 6 | Side 7 | Side 8 | Side 9 | Side 10 |
|---|---|---|---|---|---|---|---|---|---|---|
| Outside perimeter of dominant face | - | - | - | - | - | - | - | - | - | - |
| Number of duplicated sides | 1.0 | 1.0 | 1.0 | 1.0 | 1.0 | 1.0 | 1.0 | 1.0 | 1.0 | 1.0 |
| 7. Is building side an arc or an angle? | N/A | N/A | N/A | N/A | N/A | N/A | N/A | N/A | N/A | N/A |
| Theta | - | - | - | - | - | - | - | - | - | - |
| If an arc, radius | - | - | - | - | - | - | - | - | - | - |

*Workstation to Office ratio for angles and arcs is: 50%/50%

Total Arch & Angle (building shape) losses: `-` #2

8. Distance from dominant face to usable floor space: `5.25` inches

9. What percentage of the floor is encumbered `100%`

Total perimeter encumbrance losses: `285.32` #3

10. Total hand measured unusual losses: `104.16` #4

| | | SINGLE TENANT | | MULTI TENANT | |
|---|---|---|---|---|---|
| 11. | Usable square feet (BOMA): (BOMA measured) | 19,800 | SF | 19,220 | SF |
| | Total Efficiency Losses above: (Total of all yellow highlighted areas 1,2,3,4 above) | 444.5 | SF | 444.5 | SF |
| | NET USABLE square feet: (Usable SF minus Efficiency Losses above) | 19,355.5 | SF | 18,755.5 | SF |
| | Landlord's rentable SF: (As published or indicated by landlord) | 24,000 | SF | 24,000 | SF |
| | Efficiency Ratio (Landlord's rentable SF/Net usable SF) | 1.24 | SF | 1.28 | SF |

FIG. 8

Space & Construction Summary

Space Summary:

| Area | Area Size | Square Feet | Qty | Total |
|---|---|---|---|---|
| Reception Area | 15x20 | 300 | 1 | 300 |
| Coat Closet | 3x10 | 30 | 2 | 60 |
| Large Conference Room | 18x30 | 540 | 1 | 540 |
| Small Conference Room | 15x18 | 270 | 1 | 270 |
| Executive Offices | 15x18 | 270 | 3 | 810 |
| Visitor Offices | 10x15 | 150 | 2 | 300 |
| Trading Area | 8x10 | 80 | 6 | 480 |
| Large Workstations | 10x10 | 100 | 24 | 2,400 |
| Small Workstations | 7x10 | 70 | 19 | 1,330 |
| Storage Area | 10x20 | 200 | 1 | 200 |
| Copy/Fax Area | 10x25 | 250 | 1 | 250 |
| Computer/Telephone Room | 10x20 | 200 | 1 | 200 |
| Break Room | 15x20 | 300 | 1 | 300 |
| Administrative Assistant | 20x20 | 400 | 1 | 400 |

Estimated Basic Square Feet: 7,840
Plus Circulation Loss: 2,258 — 132
Estimated Usable Square Feet: 10,098
Plus 20.00% Building Inefficiency: 2,020 — 134

Estimated Rentable Square Feet: 12,118

FIG. 9

SYSTEM AND METHOD FOR EVALUATING OFFICE BUILDINGS FOR LEASING

REFERENCE TO RELATED APPLICATIONS

This application is a continuation-in-part of U.S. application Ser. No. 11/287,124, filed Nov. 22, 2005, currently pending.

TECHNICAL FIELD

The present invention relates to commercial real estate office buildings and, more particularly, to a system and method for calculating values for buildings for use by tenants in evaluating building choices for potential leasing.

BACKGROUND OF THE INVENTION

Commercial tenants typically pay a monthly rent for leased space for offices or the like based on the square footage of the space. Landlords typically calculate commercial office rental rates based on taxes, operating expenses, debt service, tenant construction costs, marketing costs and profit (or return on landlord investment). Landlords evaluate these costs on a per-square-foot basis. The only part of the rent a tenant typically can negotiate is the profit segment, which is usually 5% to 15% of the total rental rate because all of the other landlord expenses listed above are predominantly fixed. By reducing the amount of space required by a tenant, however, the effect is cost reduction on the entire rent, not just the profit portion. A tenant may thus realize substantial rent savings if they reduce the space they lease by identifying and eliminating areas in their space that are no longer needed or can be downsized, reducing inefficient architectural designs and avoiding buildings that have low efficiency ratings.

In view of the above, it is becoming increasingly important for tenants to accurately determine the amount of leased space that they actually require so design and architectural inefficiencies can be identified and eliminated. Real estate leasing firms, brokers and professional licensed architects predominantly use a multiplier to calculate space requirements. For example, the multiplier could be 200 square feet per person so that a company with 50 people would have a calculated requirement of 10,000 square feet. But some industries need more space per person because of the size and mix of executive offices and workstations. For example, attorneys and accountants may need 250-300 square feet per person because they typically use a higher ratio of offices to cubicles. Insurance companies and software consultants, however, use more cubicles than offices and may need only 150 square feet per person.

In addition, real estate leasing firms and architectural firms typically don't consider that every company has its own distinct space requirements. An analysis of the needs of two companies with similar revenues in the same industry may provide two very different results. For example, one company might want a twenty-person boardroom while the other wants a twelve-person conference room. One may decide a 6'×6' cube is big enough for employees while the other will opt for 8'×8' workstations (almost double the space). One president might want a modest 12'×15' office, the other a 20'×30' oasis with a private washroom and a wet bar. Companies may also have their own set of workspace standards, which can vary as much as 75% across an industry. Despite this variety of company needs, brokers and architectural firms typically still use the antiquated 'rule of thumb' multiplier approach to estimate space requirements, which often leads to considerable oversizing of the tenant's space.

Another disadvantage for tenants in the 'how much space do you need?' scenario is the fact that landlords, as a marketing device, often offer free space planning to potential tenants. Oftentimes, however, the landlord's architect does the planning. This is beneficial for the landlord, who usually negotiates a 'quantity discount' rate with the architect for the planning services, but not so beneficial for the tenant because the architect is paid by the square foot. As a result, the larger the space architects lay out for tenants, the more the architects are paid. Both the architect and the landlord therefore want to see the tenant contract for as much space as possible. As a result, efficient space planning is rarely emphasized by landlords or their architects.

Building spaces often feature inefficiencies which reduce the amount of actual usable square footage and, in turn, increase the amount of space tenants will need to lease. More specifically, because of numerous factors, the space efficiency of buildings varies greatly. Columns, HVAC apparatus, building loss factors and unusual building shapes (curved sides and any angles other than 90°) increase space inefficiency and are all elements that can vary greatly from building to building. As a result, the actual usable space that is available to a tenant is actually less than the amount advertised by the landlord. Because of these varying inefficiencies from building to building, one building will require a 10,000 square foot space for a tenant while another less efficient building will need 11,000 square feet for identical tenant requirements. Using this "space efficiency" concept, a tenant can realize substantial rent savings.

In addition, when a tenant's office lease is coming due, it is typical for that tenant to negotiate that lease by soliciting proposals from other buildings that have available space for lease that will meet their requirements. This creates a competitive bidding environment and usually results in more favorable lease terms for the tenant. Although it is common for the tenant to hire a real estate broker to represent them, the tenant may alternatively elect to handle these negotiations themselves.

One of the early stages of negotiating an office lease involves determining how much space the tenant will require. The next stage is then identifying which buildings have enough contiguous space available to house the projected space requirement. Furthermore, identifying the buildings may also include such parameters as budget (identified by rental rate and/or anticipated rent), quality of building, amenities and location. Since the entire process of considering alternate buildings (and moving if it is determined that an alternate location is preferable) can take 6 months to 18 months depending on the size of the tenant, it is important to include all buildings that will be potential alternatives for the tenant. Adding buildings for consideration in the middle of the process is difficult and time consuming, often delaying the project. Because leases generally have a definitive expiration date, and severe penalties for tenants that hold over (stay in their space beyond their lease expiration), it is important that the process of negotiating a new office lease stay on schedule.

During lease negotiations, there are many issues that can delay the process, cause unnecessary duplication of work, weaken the negotiating position of the tenant and/or put the tenant in jeopardy of paying severe hold over penalties mentioned above. Many of these issues revolve around the amount of space the tenant will require in any particular building.

For example, it is desirable to start with at least 3 or 4 viable options to consider when negotiating an office lease. This is because there are instances when a tenant's "preferred building" may get leased by another tenant in the middle of the transaction. Additionally, an otherwise reasonable landlord may suggest a very unreasonable term to the tenant very late in the transaction, causing them to eliminate that building from consideration.

In consideration of the above, it is imperative that the initial buildings be carefully chosen and pre-qualified to ensure that they are in fact realistic alternatives for the tenant, ensuring the tenant will not "run out of options" by the end of the negotiations and stand a chance of either holding over in their current office space or losing negotiating leverage with their existing landlord.

Despite the importance of identifying truly viable options in the negotiating process, there are many space related issues that can and do arise which prevent this from occurring.

For example, a tenant searching for buildings that have 20,000 square feet of space may include a building in their initial "short list" (buildings that are selected to receive proposals from), only to find out much later in the process that, because of inefficiencies in the building that cause additional square footage to be leased, their requirements will not fit in the same 20,000 square feet that is needed in another, more efficient building.

Additionally, a tenant may have a strict rent budget of $400,000 annually (which translates to $20.00/foot/year on 20,000 square feet). In this instance, the tenant may select a building that is quoting a $20.00 per square foot rental rate. Again, if it is determined late in the process that because inefficiencies in the subject building cause additional square footage to be leased, their requirements will not fit in the same 20,000 square feet that is needed in another, more efficient building. For the purposes of this example, the tenant's requirements may fit into 22,000 square feet and no less. Therefore, even if the building had the additional square footage to fit all the tenant's requirements, the building would no longer be a candidate because their rental rate at $20.00 per square foot will cause them to go 10% over budget.

Lastly, if the tenant has incorrectly projected they will need more space than they actually do, they may eliminate a building because it does not meet the minimum square footage desired by the tenant. However, if the tenant knew that it could fit into 18,000 square feet, instead of the 20,000 square feet it incorrectly projected, the tenant may eliminate a building that otherwise would have made their short list.

It is therefore highly desirable for a tenant to be able to project the amount of space that will be required in any office building during the early stages of building selection. This additional capability will allow the tenant to: 1) Eliminate buildings that will not have enough space for them, 2) eliminate buildings from consideration that will cause them to lease additional space that will, in turn, cause them to go over budget, 3) include buildings that may have otherwise been eliminated because it was believed they did not have enough space (when in fact, they do) and 4) understand each building's relative value by looking not only at rental rate, but a factor or rental rate and building efficiency, in turn enabling them to make more educated decisions while deciding which buildings they will solicit proposals from.

BRIEF DESCRIPTION OF THE DRAWINGS

FIG. 4 shows an efficiency data entry screen;
FIG. 7 shows a report produced by the system and method of FIGS. 1, 3 and 4;
FIG. 8 shows a report produced by an alternative embodiment of the system and method of the present invention;
FIG. 9 shows another report produced by the system and method of FIGS. 1, 3 and 4.

DETAILED DESCRIPTION OF THE INVENTION

The system and method of the present invention uses a two-phase process to determine the correct amount of space required for a tenant in a building. During the first phase, formulas are used to calculate circulation factors on a room-by-room basis in accordance with the office space requirements for the tenant. The circulation factors and office space requirements are then added to determine the "pure space" required by the tenant. The pure space is the amount of space required in a perfectly efficient environment—a perfect rectangle with no columns or inefficiencies of any kind. As a result, the system and method takes a set of given office space requirements (reception areas, offices, workstations, file areas, etc.), and projects how much circulation area is required (aisle ways, ingress, egress, etc.) to establish the ideal or pure space.

During the second phase, the pure space calculated during the first phase is multiplied by a "building inefficiency factor." No building is 100% efficient in that each has elements that affect just how efficient it is in terms of usable floor space. A building inefficiency factor provides a way of measuring the relative efficiency of various office buildings. This factor is expressed in percentage form for a building and, when multiplied by any amount of pure space, projects how much additional space is required for building inefficiencies (the "building efficiency loss"). The sum of the pure space and the building inefficiencies is the total rentable square footage required by a tenant for the building.

Phase 1: Circulation Factor Calculation

Figure 1:
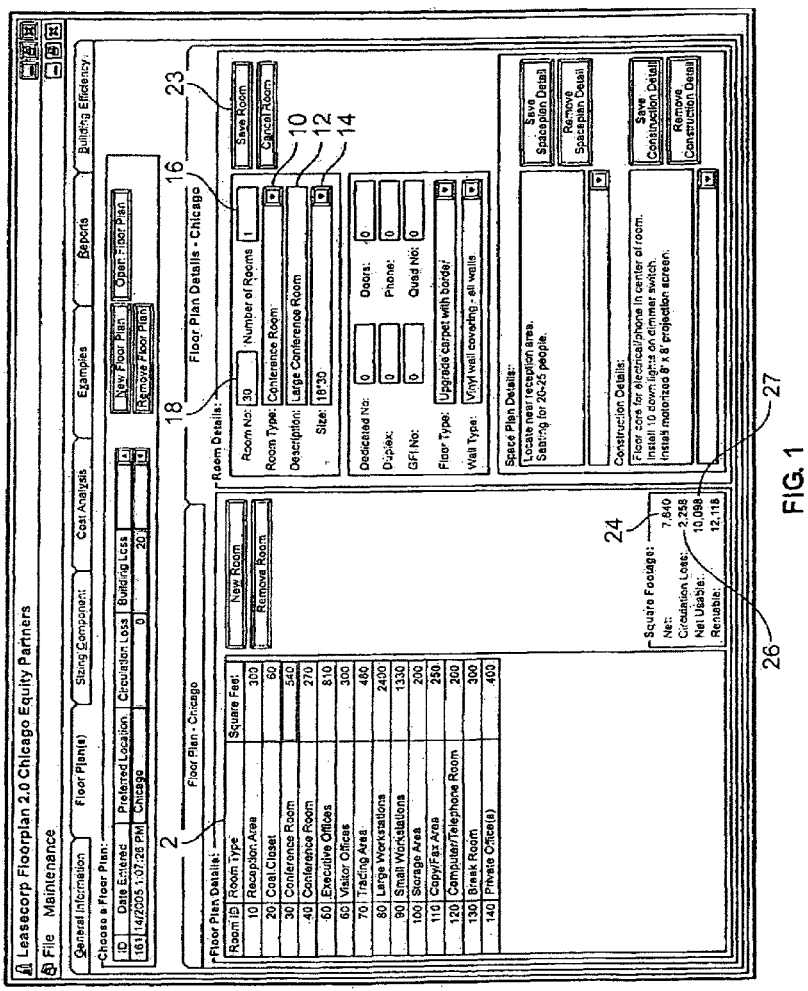
FIG. 1 shows a circulation factor data entry screen.

A circulation factor data entry screen is presented in FIG. 1. The screen or template is displayed to a user on a standard computer workstation display. The user enters into field 10 the room type (conference room, reception area, executive office, etc.). Field 10 preferably uses a pull-down menu to ensure that room names are entered in a consistent fashion. Any additional room descriptive details are entered in field 12 while the room size is entered in field 14. Field 14 preferably also features a pull-down menu of standard room sizes. If a number of identical rooms are to be entered, field 16 may be set to the appropriate number of rooms to eliminate redundant data entry. Each room entry is automatically assigned an identification number, which is indicated in field 18, and a summary of the data entered is presented in table 22 when the user selects the "Save Room" button 23.

A running total of the net square footage is maintained in field 24 of the screen of FIG. 1 as the data is entered. The circulation loss or factor is also calculated for each room as the data is entered and a running total of the circulation factor is maintained in field 26. The total of the net square footage required by the tenant and the circulation factors for the rooms is the net usable space required, which is calculated and displayed in field 32 of FIG. 1.

The formula used to calculate a circulation factor for a room or other user space requirement is selected by the system based on the square footage of the room or user space requirement.

For standard areas greater than or equal to 100 square feet, the circulation factor is calculated by multiplying 2.5 feet (½ the width of a standard aisle) times the square root of the space in question. For example, a 10'×15' office would have a circulation factor of 30.62, which is 2.5 times 12.25 (12.25 is the square root of 150 square feet). While these example calculations and the example calculations below are based on the default standard aisle width of 5 feet and the default secondary aisle width of 4 feet, the system accommodates alternative aisle dimensions that may be provided by the user.

Figure 2:
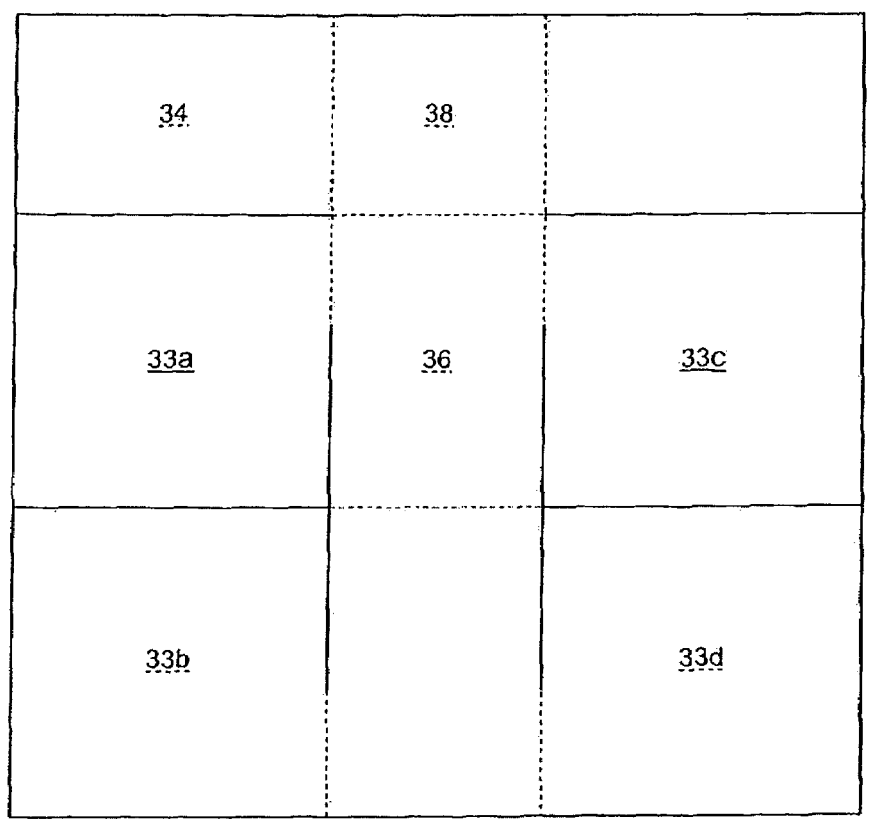
FIG. 2 is a plan view of a four workstation group and corresponding aisles.

For areas equal to or greater than 50 square feet and less than 100 square feet, the circulation factor calculation assumes a workstation with side wall panels and is therefore slightly more complicated. The square root of the space in question is initially multiplied by 2.5 feet (½ the width of a standard aisle). Since workstations of this size are usually in "packs" or "clusters" of four, stacked two high, such as workstations 33a, 33b, 33c and 33d illustrated in FIG. 2, the primary aisle 34 in FIG. 2, is assumed to be shared by two workstations (33a and 33b). As a result, this number is divided by two.

The circulation factor must also include an additional calculation for aisles needed to access the interior workstations. Since these secondary aisles, illustrated at 36 in FIG. 2, are typically 4 feet, the square root of the area is also multiplied by 2 feet (½ of a 4 foot aisle) and added to the previous total. In addition, other small adjustments in the calculation are made. These include the width of the workstation side wall panels being used. For example, an 8'×8' workstation using 2" panels is actually 8'4"×8'4". The user may provide the system with alternative panel thicknesses for use in the calculations. The aisle that links the primary aisle with the secondary aisle, illustrated at 38 in FIG. 2, must also be included. This is accomplished by assuming a 4'×2.5° aisle (width of secondary aisle×½ the width of the primary aisle) that is divided by four since four workstations share the area.

As an example, the 8'×8' workstation of FIG. 2 carries the following circulation area requirement:

1) For primary aisle 34 in FIG. 2: {8'4" (since 4" for panels)*2.5° (=½ of a 5' aisle)}/2 (because shared by stations 33a and 33b) 10.41 square feet
2) Workstation wall panel area: (8'4"*8'4")−(8'*8')(=area with panels−area without panels)=5.44 square feet
3) For secondary aisle 36 in FIG. 2: 8'4"*2(½ of a 4' aisle)=16.67 square feet
4) For aisle 38 in FIG. 2: {4' (width of secondary aisle) *2.5° (=½ width of main aisle)}/4 (=number of stations sharing area)=2.5 square feet TOTAL: 10.41+5.44+16.67+2.5=35.02 square feet circulation factor per workstation For areas less than 50 square feet, the calculation of the circulation factor is almost identical to that for areas greater than 50 square feet and less than 100 square feet except that the smaller area would dictate a smaller individual workstation (for example, 7'×7') and thus a six-workstation cluster instead of a four-workstation cluster. That would, in turn, change the calculations in that the calculation for aisle 34 in FIG. 2 would be divided by three instead of two and the calculation for aisle 38 in FIG. 2 would be divided by six instead of four. As a result, the calculation 1) of the above example would feature a denominator of three instead of two and the calculation 4) of the above example would feature a denominator of six instead of four.

For areas where one dimension is less than or equal to 3 feet, no circulation factor is needed because the short depth implies a coat closet or filing cabinet. These are usually accessible from the aisle way and don't require circulation.

The circulation factor must also address municipal fire code egress considerations. More specifically, most municipalities have fire codes that specify mandatory egress points for every 4,000 rentable square feet. As a result, the circulation factor must include square footage for an additional exit aisle having a size of 5'×20' for every 4,000 rentable square feet.

The following formula reflects the above logic and considerations and may be used for calculating the circulation factors for user space requirements:

```
DSQUAREFEET = LLENGTH * LWIDTH
IF LLENGTH OR LWIDTH <= 3 THEN
        DRENTABLESQUAREFEET = DSQUAREFEET
ELSEIF DSQUAREFEET < 50 THEN
        DAREA = (LLENGTH + (0.167 * DPW)) * (LWIDTH + (0.167 * DPW))
        DPANELS = DAREA − DSQUAREFEET
        DSAAREA = SQR(DAREA) * DSA * 0.5
        DPAAREA = SQR (DAREA) * DPA * 0.5 / 3
        DCROSS = (DPA / 2 * DSA) / 6
        DRENTABLESQUAREFEET = DSQUAREFEET + DPANELS + DSAAREA + DPAAREA + DCROSS
ELSEIF DSQUAREFEET < 100 THEN
        DAREA = (LLENGTH + (0.167 * DPW)) * (LWIDTH + (0.167 DPW))
        DPANELS = DAREA − DSQUAREFEET
        DSAAREA = SQR(DAREA) * DSA * 0.5
        DPAAREA = SQR(DAREA) * DPA * 0.5 / 2
        DCROSS = (DPA / 2* DSA) / 4
        DRENTABLESQUAREFEET = DSQUAREFEET + DPANELS + DSAAREA + DPAAREA + DCROSS
ELSEIF DSQUAREFEET > 100 THEN
        DRENTABLESQUAREFEET = DSQUAREFEET + (SQR(DSQUAREFEET) * 0.5 * DPA / 12)
END IF
        DRENTABLESQUAREFEET = DRENTABLESQUAREFEET * LROOMS
Where:  LWIDTH = WIDTH OF OFFICE OR CUBICLE (measured from panel interior surfaces)
        LLENGTH = LENGTH OF OFFICE OR CUBICLE (measured from panel interior surfaces)
        DPW = PANEL WIDTH (DEFAULT = 2")
        DPA = PRIMARY AISLE WIDTH (DEFAULT = 5')
```

DSA = SECONDARY AISLE WIDTH (DEFAULT = 4')
LROOMS = NUMBER OF OFFICES OR CUBICLES

Phase 2: Determining Building Inefficiency Factors

Figure 3:
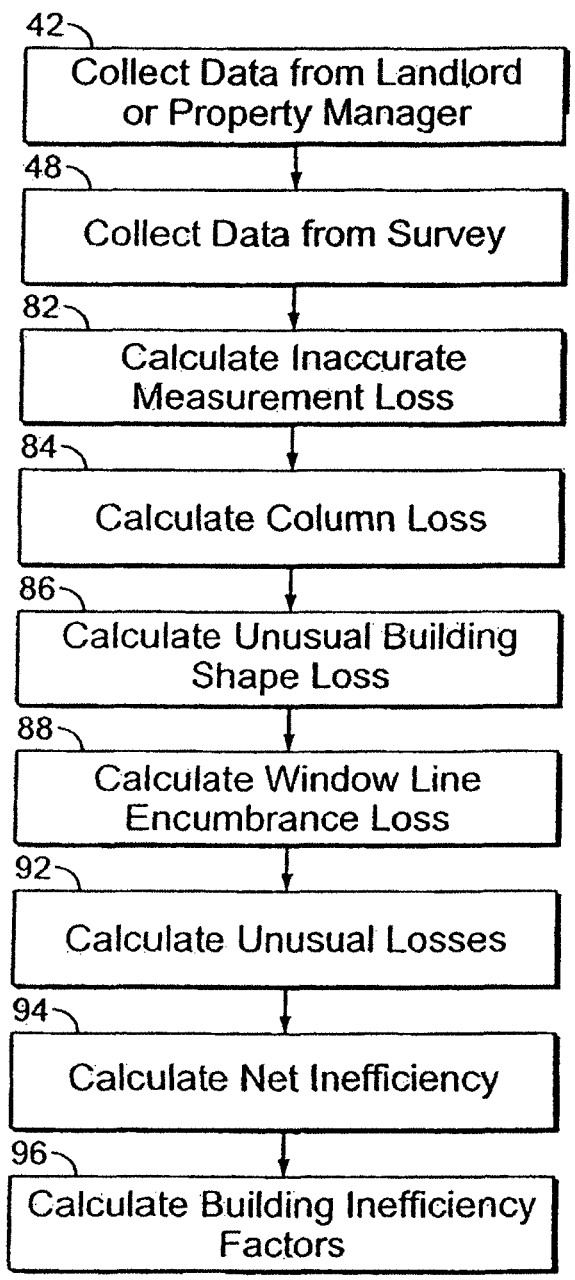
FIG. 3 is a flow chart illustrating the steps for calculating building inefficiency factors.
Figure 4:
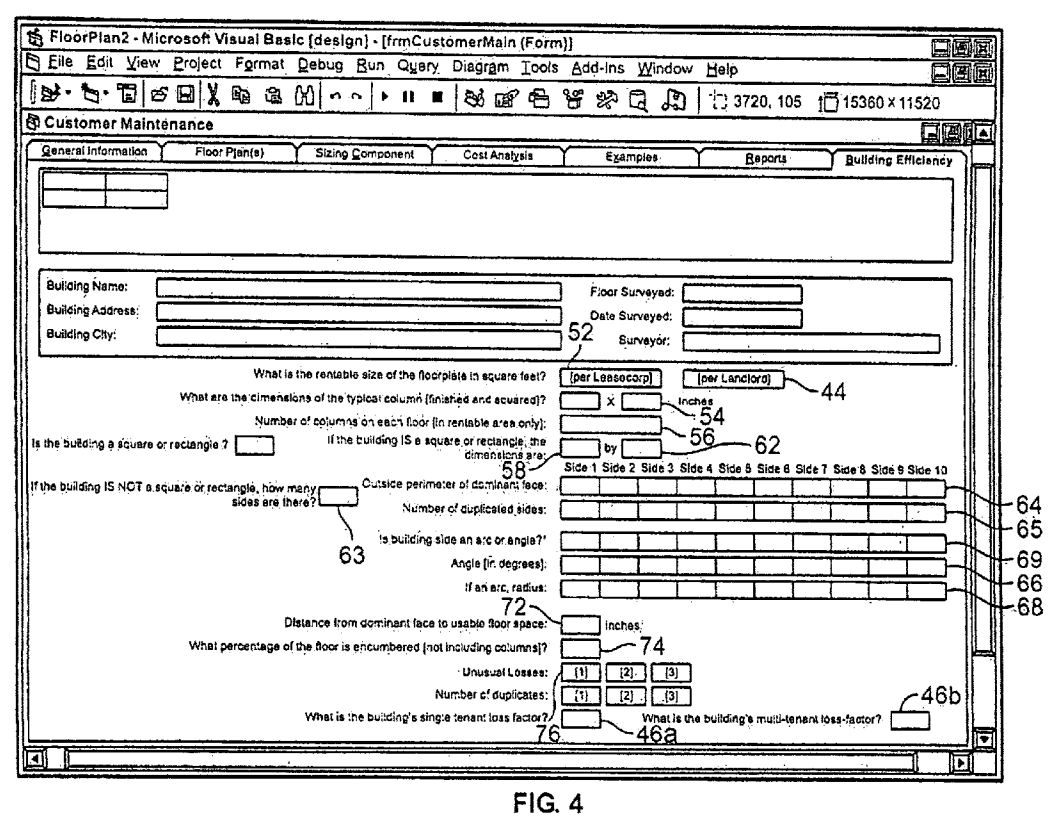

The flowchart of FIG. 3 shows the process for determining the building inefficiency factors. As indicated by block 42 of FIG. 3, the first step in calculating the inefficiency factors for a building is collecting data from the building landlord or property manager. The building efficiency data entry screen is presented in FIG. 4. The data collected from the landlord or property manager includes the rentable square footage of the space, which is entered in field 44 of FIG. 4, as well as the single tenant loss factor and the multi-tenant loss factor, which are entered in fields 46a and 46b, respectively.

Next, as indicated by block 48 of FIG. 3, some additional detailed information for the space is also obtained via an on-site survey or by utilizing building drawings. This information includes the rentable square footage of the space which is determined in accordance with standards issued by Building Owners Management Association International (BOMA). BOMA has created the standard method for measuring floor area in office buildings, which was approved by the American National Standards Institute, Inc. on Jun. 7, 1996. These standards are accepted as the basis for measuring the usable and rentable square feet in office buildings. The rentable square footage thus determined is entered in field 52 of FIG. 4.

In addition, during the survey or drawing review, the dimensions of a typical column for the space are determined as well as the number of columns on each floor. These values are entered into fields 54 and 56 of the screen of FIG. 4, respectively. Even if the columns are round, they are assumed to be squared with the length and width of the columns equal to their diameters.

The "dominant face" of the building is made up of the vertical structures which make up the largest portion of the building side walls. If the building is a square or rectangle, the building depth and width (measured from the exterior surfaces of the dominant faces) are entered in fields 58 and 62. If the building is not square or rectangular, the number of sides is entered in field 63 and the width of each side of the dominant face is entered in fields 64. The number of duplicate sides are entered in fields 65 to limit the number of side widths that must be entered in fields 64. If any of the sides of the dominant face features a curve, the angle and arc radius of the side is indicated in fields 66 and 68, respectively. If any of the sides of the dominant face are joined by angles other than 90°, the angles are entered into fields 66 (the angle between sides 1 and 2 is entered under the column for Side 1, the angle between sides 2 and 3 is entered under the column for Side 2, etc.). Field 69 is used to indicate that the side is curved or is at an angle other than 90° with respect to the neighboring wall in the order entered in fields 64.

If the perimeter of a floor is encumbered, such as by HVAC units or the like, the average distance from the dominant faces to the usable floor space is entered in field 72 and the percentage of the perimeter of the floor that is encumbered is also determined and entered in field 74. Also, the areas of losses due to water columns, private stair wells, angled column supports or other unusual losses are obtained and entered into fields 76.

Once the required data and information is gathered for a building space, five losses are calculated, as indicated by blocks 82, 84, 86, 88 and 92 of FIG. 3, and added together to obtain the building's net inefficiency (block 94). The building inefficiency factors are then calculated (block 96).

As illustrated in FIG. 3, block 82, the first loss calculated is the inaccurate measurement loss. The inaccurate measurement loss is simply the difference between the landlord or property management's stated rentable square footage (field 44 in FIG. 4) and the rentable square footage calculated using BOMA standards (field 52 in FIG. 4).

The second loss is the column loss, calculated at block 84 in FIG. 3. The column loss is the loss in space due to the support columns encumbering the space. The column loss thus equals the area of a typical column (obtained by multiplying the dimensions of fields 54 of FIG. 4) multiplied by the number of columns (entered in field 56).

The third loss calculated is the unusual building shape loss, as indicated at block 86 in FIG. 3. If the building floor area is square or rectangular, there is no building shape loss. If the building floor area is not a square or rectangle, there is a building shape loss associated with each building side that is not flat. The equation used to calculate the building loss is selected based on whether the building features angled or curved side walls.

Figure 5:
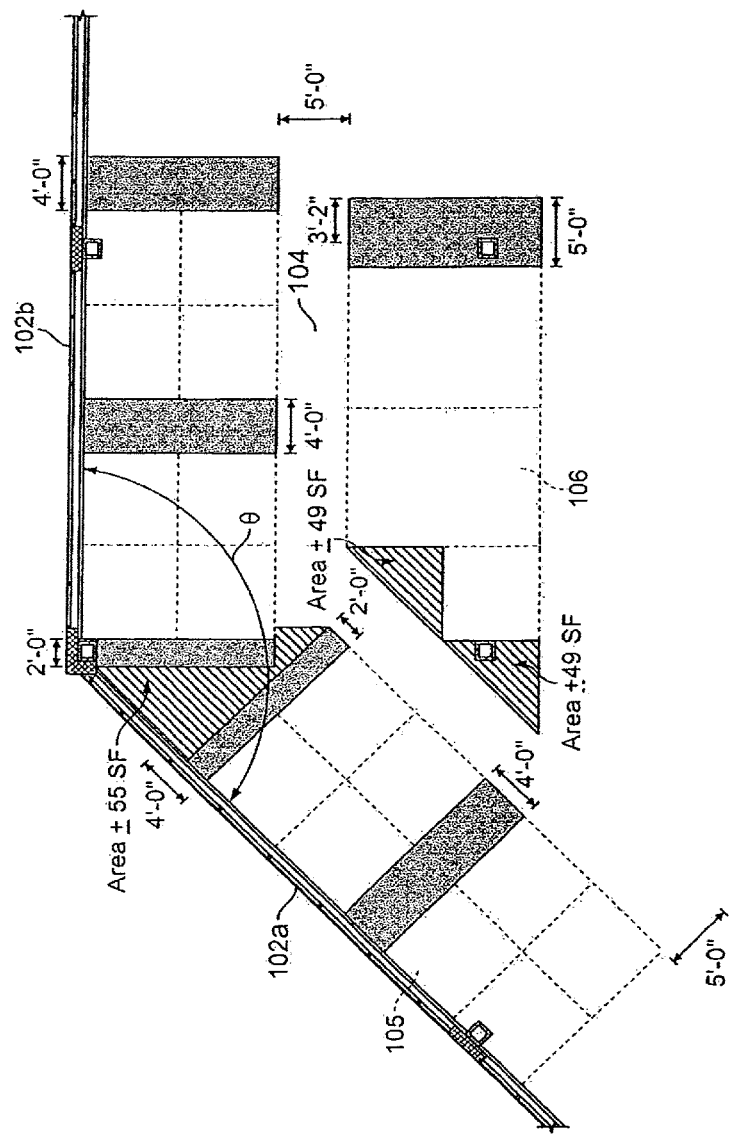
FIG. 5 is a plan view of a portion of a floor space of a building having walls forming an angle other than 90° illustrating why buildings with angles other than 90° create inefficiency losses when trying to lay out workstations.

If the building features angled side walls (walls at angles other than 90°), as illustrated in general at 102a and 102b in FIG. 5, a 50/50 mix of offices and workstations is taken into account by considering one side of the aisle, 104 in FIG. 5, as being workstations 105 and the other side being offices 106. The standard cubicle width by cubicle depth is assumed to be 7' by 7' while the standard office width by office depth is assumed to be 10' by 15'. The inside angle, θ in FIG. 5, is measured and the following formula is applied for each unique angle θ:

$$BSL = ((OD/2)/TAN((\Theta * CONPI/180)/2)*2)*D$$

Where: BSL=building shape loss
OD=office depth (Default=15')
Θ=inside angle between angled walls (Field 66 of FIG. 4)
CONPI=3.14159265359
D=number of cuplicate angles The building shape losses for the sides calculated using the above formula are then added to obtain the total building shape loss due to angled sides. The above formula, however, is only used when the two walls that make up the angle are each at least 25 feet in length, including before a next angle. In the event that either or both of the walls fail to meet this condition, the loss is measured by hand and entered as an "unusual loss" (block 92 in FIG. 3). The hand measurement is performed by measuring the area that would be taken up if the irregular angle were squared (i.e. instead of two walls forming an irregular angle, there were three walls forming two 90 degree angles).

Figure 6:
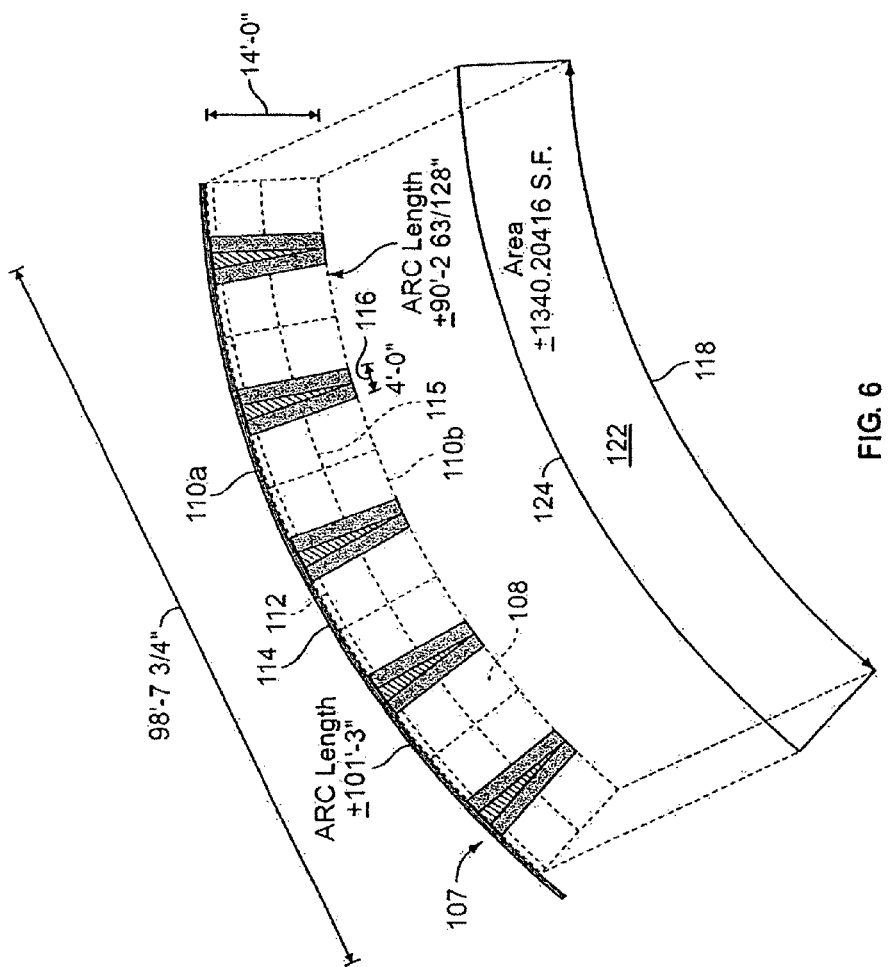
FIG. 6 is a plan view of a portion of a floor space of a building having a curved wall illustrating why buildings that have a curved building side create inefficiency losses when trying to lay out workstations.

If the building possesses curved side walls, as indicated in general at 107 in FIG. 6, a formula is used that calculates the loss based on the number of workstations in 14'×14' groups of four (indicated in phantom at 108 in FIG. 6) and number of 10'×15' offices that would fit between upper and lower arcs, illustrated at 110a and 110b, respectively, in FIG. 6. In the formula, which is presented below, the segment height, which is the distance between the workstation or office wall indicated at 112 in FIG. 6 and the peak 114 of the section of arc opposing that wall, is calculated and added to the depth of two workstations or one office. In addition, the width of two workstations (115 in FIG. 6) and one aisle (116 in FIG. 6) or one office width (no aisle for accessing the inner workstations required) is divided into the length of the lower arc, indicated at 118 in FIG. 6. Since offices can be adjusted to fit exactly in the area defined between the upper and lower arcs (122 in FIG. 6), no further fit calculations are done for offices.

Since workstations must fit at least one cubicle width and an aisle width within the area 122 of FIG. 6, however, additional fit calculations are done. More specifically, if one more workstation group of four would fit if there were six more inches, another group is added to the result. If not, another calculation is done to see if one workstation width and an aisle would fit. If so, one workstation width and aisle is added to the result. If not, workstations are spread evenly over the length of the arc.

The square footage of the workstation groupings that would fit squarely between the arcs is calculated and subtracted from the total area between the arcs, indicated at 122 in FIG. 6. The square footage of offices that would fit squarely between the arcs is also calculated and subtracted from the total area between the arcs. The remaining square footage for each calculation is added and the total is multiplied by the number of duplicated sides to obtain the total building shape loss due to curved sides.

The following formula reflects the above logic and considerations and may be used for calculating the building shape loss if the building features one or more curved side walls:

```
Θ = (2 * CW) / (2 * s)
Θo = OW / (2 * s)
Where:    Θ = measure in radians of the central angle subtending the arc for workstations
          Θo = same as above for offices
          CW = width of cubicle or workstation (default = 7')
          OW = width of office (default = 10')
          s = radius of the arc
'DERIVED ARCSIN FUNCTION FOR WS (WORKSTATION) AND OFFICE
ARCSIN = ATN(Θ / SQR(-Θ * Θ + I))
ARCSINO = ATN(Θo / SQR(-Θo * Θo + I))
Where:    ATN = arctangent
          SQR = square root
'CALCULATE WS AND OFFICE SEGMENT HEIGHT
SH = s - (s * COS (ARCSIN))
SHO = s - (s * COS(ARCSINO))
Where:    SH = segment height for workstations
          SHO = segment height for offices
'RADIUS LESS WS OR OFFICE AND SEGMENT HEIGHT DEPTHS
R2 = s - ((CD * 2) + SH)
R2O = s - (OD + SHO)
Where:    R2 = radius of arc less height for two workstations and segment height
          R2O = radius of arc less office height and segment height
          CD = cubicle or workstation depth (default = 7')
          OD = office depth (default = 15')
'ARC LENGTH AVAILABLE FOR WORKSTATIONS OR OFFICES
SA2 = R2 * A * CONPI / 180
SA2O = R2O * A * CONPI / 180
Where:    SA2 = arc length (arc at bottom of workstations)
          SA2O = arc length (arc at bottom of offices)
          CONPI = 3.14159265359
          A = central angle of the circle whose upper boundary is the arc
'TWO WS WIDTH AND AISLE WIDTH
TWOCWAW = CW * 2 + CONAW
Where:    TWOCWAW = two workstation or cubicle widths and an aisle width
          CONAW = aisle width (default = 4')
'TWO WS DEPTH AND SEGMENT HEIGHT AND OFFICE DEPTH
TWOCDSH = CD * 2 + SH
OFDSH = OD + SHO
Where:    TWOCDSH = two workstation or cubicle depths and segment height
          OFDSH = office depth and segment height
'HOW MANY WSs FIT?
IF INT((SA2 + 0.5) / TWOCWAW) - INT(SA2 / TWOCWAW) <> 1 THEN
Where:    INT = returns integer portion of a number
'IF ADDITIONAL SIX INCHES WILL NOT FIT ADDITIONAL WS
WSFIT= SA2 / TWOCWAW
Where WSFIT = total square footage of workstations or cubicles that fit
'PERCENT OF WS THAT WILL FIT
REMAINDER = (WSFIT - INT(WSFIT)) * TWOCWAW
'CALCULATE SQ. FOOTAGE WITH ONE WS AND AISLE IF THERE IS ENOUGH ROOM
          IF REMAINDER >= CW + CONAW THEN
                    WSFIT = ((INT(WSFIT) * TWOCWAW) + (CW + CONAW)) * TWOCDSH
          ELSE
                    'OTHERWISE, CALCULATE SQUARE FOOTAGE
                    WSFIT = INT(WSFIT) * TWOCWAW * TWOCDSH
          END IF
ELSE
'NUDGE ADDITIONAL WS GROUP INTO ARC IF ONLY 6" OR LESS NEEDED
          WSFIT = INT((SA2 + 0.5) / TWOCWAW) * TWOCWAW * TWOCDSH
END IF
'SQUARE FOOTAGE OF OFFICES?
OFFIT = SA2O * (OD + SHO)
Where:    OFFIT = total square footage of offices that fit
```

-continued

```
'TOTAL WS LOSS
WSTOT = (A / 360 * ((CONPI * (S ^2)) – (CONPI * (R2 ^2)))) – WSFIT
'TOTAL OFFICE LOSS
OFTOT = (A / 360 * ((CONPI * (S ^2)) – (CONPI * (R2O ^2)))) – OFFIT
'CALCULATE TOTAL LOSS TIMES THE NUMBER OF DUPLICATED SIDES
BSL = (WSTOT + OFTOT) * D
Where:    BSL = Building Shape Loss
          D = Number of Duplicate Sides (Fields 65 of FIG. 4)
```

Next, as illustrated by block 88 in FIG. 3, the window line encumbrance loss is calculated. This loss takes into account situations where the perimeter of a floor is encumbered, such as by HVAC units or the like. The window line encumbrance loss is calculated by taking the horizontal distance from the dominant face to the usable space (from field 72 in FIG. 4) and multiplying it by the perimeter of the building (determined using fields 58 and 62 or 64 and 65 of FIG. 4).

Occasionally, there are space area losses on a floor that do not fit into any of the standard formulas above, which are calculated as indicated by block 92 of FIG. 3. In addition to the irregular angle loss described above, such losses may include unusual shaft penetrations, columns that run diagonally through the space (taking up more usable square feet) and leftover stairwells from previous tenants connecting two leased floors. Any irregular angle which fails to meet the conditions specified in the paragraph above regarding angled side walls and FIG. 5, is hand-measured and also included as an unusual loss. These are not required to be deducted by BOMA standards, and are considered unusual losses. These losses are measured, input in fields 76 of FIG. 4 and used as actual square foot losses, as opposed to being calculated by formulas.

Once the five losses of blocks 82-92 of FIG. 3 are calculated or otherwise determined, they are used to calculate the net inefficiency for the space, as indicated by block 94 of FIG. 3. The net inefficiency is calculated by first adding the five losses of blocks 82-92 of FIG. 3 and then establishing a ratio between those losses and the landlord's stated rentable square feet (from field 44 of FIG. 4).

As illustrated in block 96 of FIG. 3, once the net inefficiency is calculated, the single tenant inefficiency factor and the multi-tenant inefficiency factor are calculated using the following formulas and the building single tenant loss factor (from field 46a of FIG. 4) and the building multi-tenant loss factor (from field 46b of FIG. 4):

SINGLE TENANT INEFFICIENCY FACTOR=[(1+NET INEFFICIENCY)*(1+BUILDING SINGLE TENANT LOSS FACTOR)]−1

MULTI-TENANT INEFFICIENCY FACTOR=[(1+NET INEFFICIENCY)*(1+BUILDING MULTI-TENANT LOSS FACTOR)]−1

As will be illustrated below, the pure space is multiplied by the appropriate inefficiency factor to provide an inefficiency add-on. The single tenant inefficiency factor is used when the space in question occupies the entire floor of a building so that the tenant is the sole tenant of the floor. The multi-tenant inefficiency factor is used if the space in question is only a portion of the building floor so that the tenant shares the floor with another tenant or tenants.

An example of a report page produced by and in accordance with embodiments of the system and method and illustrating a calculation of the single and multi-tenant inefficiency factors performed in accordance with FIG. 3 and the above description is presented in FIG. 7.

An example using circulation factors calculated in accordance with Phase 1 above and inefficiency factors calculated in accordance Phase 2 above is presented in Table 2.

TABLE 2

Calculation of Required Space

| | | |
|---|---|---|
| Net usable square footage: | Simply the net square footage when all area requirements are added together (before circulation): | 10,500 |
| Circulation Factor: | The extra space required for aisle ways, ingress and egress calculated in Phase 1: | 1,575 |
| Pure space: | The sum of net usable square feet and circulation factor; also the space required in a perfectly efficient environment: | 12,075 |
| Building Inefficiency Factor: | The add on calculated in Phase 2 for loss attributable to building inefficiencies (assume single tenant for this example), multiply pure space by: | 17.5% |
| Total rentable square footage: | Total space that should be required to lay out the given requirements in this particular building: | 14,188 |

In an alternative embodiment of the invention, use of a landlord's loss factor (single tenant or multi-tenant) is avoided in calculating the total rentable square footage. Such an approach is desirable when there is concern that landlords are either not calculating their loss factors correctly according to BOMA standards or are misrepresenting their loss factors in an attempt to have their buildings' efficiency represented favorably. In such an alternative embodiment of the invention, instead of calculating the net inefficiency for a space and multiplying that number by the landlord's loss factor, the actual usable square footage of the space is measured. This may be easily accomplished in situations where a draftsman has a computer aided design (CAD) file of the space. Next, the efficiency losses from blocks 84-92 of FIG. 3 are subtracted from the measured usable square footage to provide the net usable square footage. An efficiency ratio is next calculated by dividing the landlord's stated rentable square footage (from field 44 of FIG. 4) by the net usable square footage. The resulting efficiency ratio may be multiplied by the pure space to obtain the rentable area that will be required for the tenant's space requirements ("Total rentable square footage" in Table 2 above). An example screen from this embodiment of the system and method of the invention showing the calculation of the efficiency ratio for both single and multi-tenant situations is provided in FIG. 8.

An example of another report page produced by and in accordance with embodiments of the system and method is presented in FIG. 9. The circulation factor is presented at 132 while the inefficiency factor is presented in field 134. Prior to production of this report, the user has entered whether the single tenant or multi-tenant situation applies and the specific loss factors of the building in question.

The circulation factors, inefficiency factors and related calculations provided by the system and method may be used by real estate firms to assist clients in determining appropriate rentable areas required or to identify inefficiencies in space plans prepared by outside architects and planners. In addition, the system and method may be used by purchasers of office buildings for analyzing the relative efficiency and potential marketability of an office building. The system and method may also be used by the architectural/design industry to project the appropriate amounts of space for their clients.

Additional capabilities and benefits are available for tenants using the results of the calculations performed above.

For example, one additional capability comes from using the inefficiency factor calculated in the previous invention to determine a building's relative value. Since it has been determined that each building has a distinct set of inefficiencies that affect the building's inefficiency factor, it follows that a tenant will be required to lease varying amounts of space from building to building to fit in the same requirements. A need to lease more space results in an increase in the tenant's rent.

The current process of considering various building options at the end of a tenant's lease typically involves viewing many alternatives and selecting a handful to be considered for the short list (the buildings the tenant will solicit proposals from). In this process, the tenant may consider the quality of the building as well as the rental rate to select the short list of buildings that appeal to them most. However, as identified above, considering a building's rental rate can be misleading considering that each building will require differing amounts of space because of the building's inefficiency factor. As such, if the tenant were able to compare the actual rent (instead of just considering the rental rate) from building to building, the tenant would be able to make a more educated decision on their short list. However, because of the expense associated with preparing space plans at every building that has available space for a particular tenant, the current process in the industry is for a tenant to select their short list before any architectural space plans are prepared.

By using the inefficiency factor calculated above, it is possible to project a building's relative value without incurring the expense of a multitude of space plans. Although establishing a building's inefficiency factor is a rather lengthy process, once it is established for the building, the building's relative value can be determined simply by multiplying the building's quoted rental rate by the building's inefficiency factor. Once the list of all of the buildings under consideration is established, the relative value of each building can further be divided by a common inefficiency factor, or other predetermined constant, so the implied value is more easily understood by the tenant.

As an example, in Table 3 below, this common inefficiency factor is represented by the percentage 1.16. As a result, the relative cost for building number 3, which has an inefficiency factor of 1.16, is the same as the quoted rate because the building's inefficiency factor is identical to the common inefficiency factor. As the inefficiency factor's at different buildings become greater, so do the relative values. It is easy to see that because of this knowledge, a tenant's decision to select one building over the next can easily be changed. For instance, without this knowledge, a tenant might have selected building 4 instead of building 5 for the short list because it appears building 4 would be less expensive if only looking at the quoted rental rate. However, when also factoring in the building's relative value, the tenant will find that building 5 is a better value because even though it is a nicer building than building 4, it will require less square footage and therefore less rent. The tenant may also make a similar decision on building 3 over 4 because they are similar quality buildings but building 3 will require less space to be leased.

TABLE 3

Example of Relative Value Determination and Comparison

| # | Building Name | Bldg Class | Quoted Rate | Inefficiency Factor | Relative Value |
|---|---|---|---|---|---|
| 1 | 123 Corporate Lane | B | $23.00 | 1.28% | $25.39 |
| 2 | 111 Plaza Drive | B+ | $24.50 | 1.19% | $25.13 |
| 3 | 777 Campus Lake | A− | $26.00 | 1.16% | $26.00 |
| 4 | 555 Business Court | A− | $26.00 | 1.33% | $29.81 |
| 5 | 999 Executive Place | A+ | $28.00 | 1.20% | $28.96 |

Another additional capability available by using the inefficiency factor calculated above is the ability of the tenant to identify or pre-qualify buildings that either don't have enough space or will not meet a projected budget.

As discussed earlier, it is very important for a tenant to maintain at least 3 or 4 qualified building alternatives when going through the process of lease negotiations to ensure both a competitive bidding environment and backup locations in case preferred buildings fall out of the running. Consequently, it is beneficial for a tenant to make sure that the starting "short list" of buildings are all qualified to meet the tenant's requirements.

As noted previously, two ways that a tenant may make a mistake in selecting potential buildings for their short list is to 1) select a building that does not have enough space for them and 2) select a building that will not meet their rent budget. When considering that every building has unique qualities that require differing amounts of space, identifying suitable buildings is no easy task. However, by using the information calculated in the manner described previously, the tenant can collect the desired information and, in turn, make more educated decisions.

More specifically, the calculations described previously allow a tenant to project the amount of space that should be required given an efficient layout in a known building. However, they can also be used to identify the amount of space that will be required in buildings with various efficiencies to ensure that a building will have enough available space for them.

In an example presented in Table 4 below, the calculations presented above were used to project how much space should be required in an office building having an inefficiency factor of 15%. The required space is identified in column 2 of Table 4 as "Estimated RSF (rentable square feet) in Building." However, the RSF may also be used to project how much space will be needed in hypothetical buildings that are not as efficient, that is, buildings having efficiencies that range from 15% to 27% in increments of 3%. This is accomplished by dividing the RSF of the building having the efficiency factor of 15% by 1.15 (1+the inefficiency factor in decimal form) to obtain the pure space and then multiplying the pure space by the varying building inefficiency factors and adding the result to the pure space to obtain the RSFs listed in Table 4. As described above with respect to Table 2, the pure space is the sum of the net usable square footage and the circulation factor required for a building. Both the increments and ranges can be changed for a specific tenant.

As is illustrated in Table 4, a tenant may require 17,107 square feet in the building having an inefficiency factor of 15% but 18,892 in a building having an inefficiency factor of 27%. Having this knowledge enables a tenant to disqualify a building that has 17,500 square feet available in the less efficient building when this building may have otherwise been selected to a short list (and eliminated much later in the negotiation process).

As previously mentioned, it may also be important for a tenant to understand whether or not a building's rental rate and subsequent rent will fit into a target budget for that tenant. By knowing the estimated rentable square footage in a building and multiplying by the quoted rental rate, a tenant can project what the anticipated rent will be for that property.

In the example of Table 4, the tenant has identified their budget as being $28.00 per square foot if they are able to be in an office building where they will require only 17,100 square feet. However, as the table suggests, if the tenant prefers a less efficient building that will consequently require more square footage, the allowable rental rate to meet the same rent budget will be reduced. The target rental rate can be calculated by dividing the annual rent budget (usually identified by the tenant) by the estimated rentable square feet (RSF) in any particular building. Again, one can see that having this knowledge would allow a tenant to eliminate a building from consideration when it otherwise may have been considered. For example, a tenant who otherwise had a $28 budget in the building having a 15% inefficiency factor would now eliminate a building with a $26.75 rental rate because the building's 27% inefficiency factor would cause the tenant to lease additional space and put the correlating rent outside the tenant's budget.

TABLE 4

Example of Rentable Square Footage and Target Rental Rate Comparison

| Inefficiency Factor | Estimated RSF in Building (sf) | Target Rental Rate |
|---|---|---|
| 15% | 17,107 | $28.00 |
| 18% | 17,553 | $27.29 |
| 21% | 17,999 | $26.61 |
| 24% | 18,445 | $25.97 |
| 27% | 18,892 | $25.35 |

As an additional budgeting tool, a tenant may also prepare a table that projects the actual monthly rent amount in cases where the actual buildings are known. The monthly rental rate can easily be converted into a yearly rent amount if the tenant prefers one over the other simply my multiplying the monthly amount by 12, or vice versa by dividing the yearly rent amount by 12. In the example of Table 5 below, where the Quoted Rate is the rent amount per foot per year, a tenant who may have set a monthly budget of $30,333 would be able to eliminate 123 Corporate Lane and 555 Business Court because the buildings are projected to exceed the monthly budget.

TABLE 5

Example of Monthly Rent Amount Determination and Comparison

| Building Name | Inefficiency Factor | Est. Space Needed at Building | Quoted Rate | Monthly Cost (est.) |
|---|---|---|---|---|
| 123 Corporate Lane | 1.28% | 15,448 | $24.00 | $30,896 |
| 111 Plaza Drive | 1.19% | 14,362 | $24.50 | $29,322 |
| 777 Campus Lake | 1.16% | 14,000 | $26.00 | $30,333 |
| 555 Business Court | 1.33% | 16,051 | $25.50 | $34,108 |
| 999 Executive Place | 1.20% | 14,482 | $25.00 | $30,170 |

Although the quoted rental rate for the purposes of these examples is identified as the rental rate quoted by the building, a knowledgeable lease negotiator will recognize that quoted rental rates are typically variable depending on a tenants requirements and lease term. It is understood that this column may be adjusted to the preference of the tenant (i.e. negotiated rental rate, net rental rate, net rental rate after abatement, etc.). Regardless of what budget multiplier is used, it is assumed that the same multiplier would be used for all properties, thus not materially affecting the integrity of the comparison.

Figure 10:
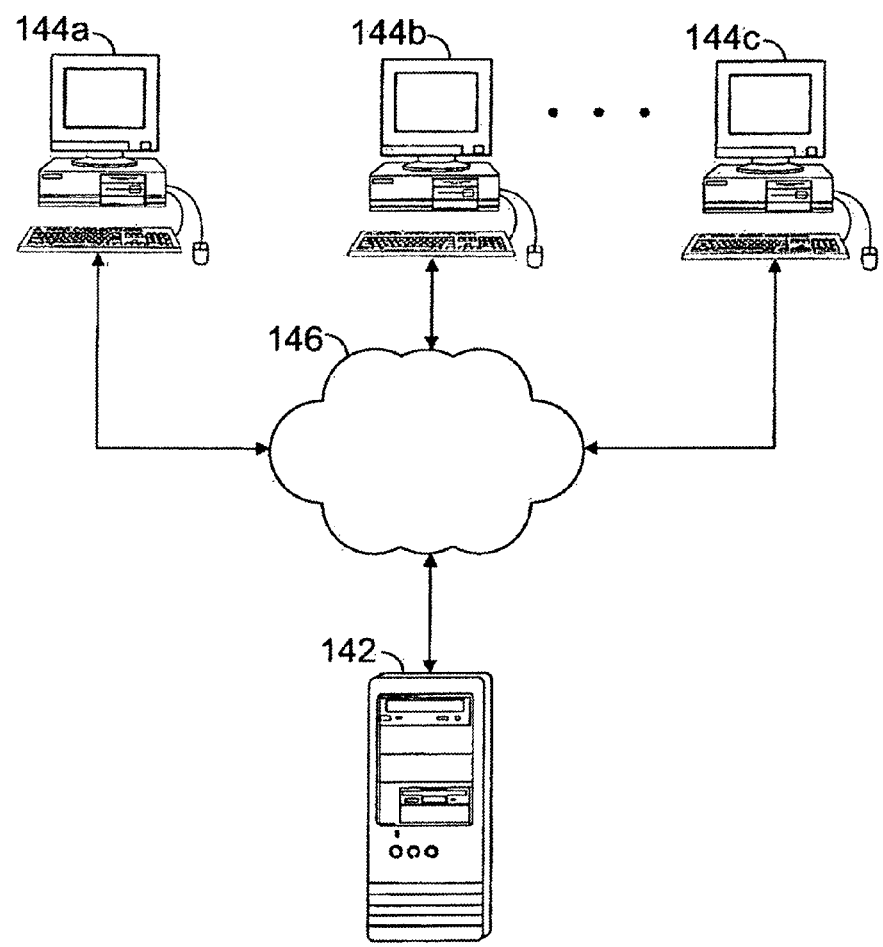
FIG. 10 is a schematic illustrating an embodiment of the system of the invention.

The hardware of an embodiment of the system of the invention is illustrated in FIG. 10. The system features a server computer 142 including a processor or microprocessor and memory storage. The application software for performing the calculations described above is loaded onto the server 142 as is the database that stores the data entered into and calculated by the application software. As an example only, the application may be written in Visual Basic 6.0 or Visual Basic .Net with MICROSOFT ACCESS 3.0 or SQL Server as a data container. The formulas and code for performing circulation factor calculations, inefficiency factor calculations and other calculations described above may also be programmed in Visual Basic for Applications (MICROSOFT WORD), standard spreadsheet applications (MICROSOFT EXCEL) and standard programming languages such as SEQUEL. The data can be migrated into any compatible database.

User workstations 144a-144c featuring displays, such as personal computers, communicate with the server 142 through a network 146 such as a local area network or the Internet (using, for example, Microsoft's NET framework and a web server). User's workstations 144a-144c may connect to the application and database on server 142, for example, through ODBC (Open Database Connectivity). As an alternative to a network system, the application software and database may reside on a standalone personal computer. The server or personal computer may include a compact disk (CD) drive so that the application software may be downloaded or run off of a CD itself. The application software may alternatively be stored on other types of machine-readable mediums.

While the preferred embodiments of the invention have been shown and described, it will be apparent to those skilled in the art that changes and modifications may be made therein without departing from the spirit of the invention, the scope of which is defined by the appended claims.

What is claimed is:

1. A system for calculating a relative value of an office building for use in evaluating building lease choices comprising:

a. memory storage having software which permits a user to input a building single tenant loss factor, a building multi-tenant loss factor, a landlord's stated rentable square feet for a space in the building, data relating to losses in actual usable space in the building and a rental rate for the building;

b. a processor in communication with the memory storage and using the software to:
   i) calculate an inefficiency factor for the building based on the data relating to losses in actual usable space in the building by;
      A. calculating an inaccurate measurement loss based on a difference between the landlord's stated rentable square footage for space in the building and a rentable square footage for the space in the building calculated using standards;
      B. calculating a column loss based upon areas of column encumbering the space in the building if a column is present in the space of the building;
      C. calculating an unusual building shape loss based on a building side that is not flat if a side of the building is not flat or is at an angle other than approximately 90° with respect to an adjacent wall;
      D. calculating a window line encumbrance loss based on a perimeter of the space in the building and an encumbrance positioned at the perimeter if an encumbrance is positioned at the perimeter in the space of the building;
      E. calculating an unusual loss that does not fit into steps A. through D if such an unusual loss is present in the space of the building;
      F. adding the losses of steps A. through E.;
      G. dividing the added losses of step F. by the landlord's stated rentable square footage for a space in the building to calculate a net inefficiency;
      H. calculating the inefficiency factor based on the net inefficiency and the building single-tenant loss factor or the building multi-tenant loss factor;
   ii) multiply the rental rate by the inefficiency factor to obtain the relative value of the building;
c. a display in communication with the memory and the processor, said display presenting to a user the relative value of the building.

2. The system of claim 1 wherein the processor also uses the software to divide the relative value of the building by a predetermined constant.

3. The system of claim 2 wherein the predetermined constant is a common inefficiency factor.

4. The system of claim 1 wherein the building side of step b.i) C that is not flat is angled.

5. The system of claim 1 wherein the, building side of step b.i) C that is not flat is curved.

6. The system of claim 1 wherein the inefficiency factor calculated in b.i) is a single tenant inefficiency factor for use in calculating the space required when only the tenant will be occupying a floor of the building.

7. The system of claim 1 wherein the inefficiency factor calculated in b.i) is a multi-tenant inefficiency factor for use in calculating the space required when the tenant will have to share a floor of the building with another tenant.

8. The system of claim 1 wherein the processor also uses the software to provide a comparison of the relative value of the building to relative values of a number of other buildings having differing inefficiency factors.

9. The system of claim 1 wherein the processor and memory storage are included in a server and the display is included in a user workstation that communicates with the server through a network.

10. The system of claim 1 wherein the processor, memory storage and display are included in a standalone computer.

11. A system for calculating a target rental-rate of an office building to assist a user in evaluating building lease choices comprising:

a. memory storage having software which permits a user to input areas required by the user, a building single tenant floss factor, a building multi-tenant loss factor, a landlord's stated rentable square feet for a space in the building, data relating to losses in actual usable space in the building and a rent budget for the user;

b. a processor in communication with the memory storage and using the software to:
   i) determine a pure space based on the input areas;
   ii) calculate an inefficiency factor for the building based on the data relating to losses in actual usable space in the building by;
      A. calculating an inaccurate measurement loss based on a difference between the landlord's stated rentable square footage for space in the building and a rentable square footage for the space in the building calculated-using standards;
      B. calculating a column loss based upon areas of column encumbering the space in the building if a column is present in the space of the building;
      C. calculating an unusual building shape loss based on a building side that is not flat if a side of the building is not flat or is at an angle other than approximately 90° with respect to an adjacent wall;
      D. calculating a window line encumbrance loss based on a perimeter of the space in the building and an encumbrance positioned at the perimeter if an encumbrance is positioned at the perimeter in the space of the building;
      E. calculating an unusual loss that does not fit into steps A. through D if such an unusual loss is present in the space of the building;
      F. adding the losses of steps A. through E.:
      G. dividing the added losses of step F. by the landlord's stated rentable square footage for a space in the building to calculate a net inefficiency;
      H. calculating the inefficiency factor based on the net inefficiency and the building single-tenant loss factor or the building multi-tenant loss factor;
   iii) multiply the pure space by the inefficiency factor to obtain a building efficiency loss;
   iv) add the building efficiency loss to the pure space to obtain a space required for the user in the building;
   v) divide the rent budget by the space required for the user in the building to obtain the target rental rate;
c. a display in communication with the memory and the processor, said display presenting to a user the target rental rate of the building.

12. The system of claim 11 wherein the inefficiency factor calculated in b.ii) is a single tenant inefficiency factor for use in calculating the space required when only the user will be occupying a floor of the building.

13. The system of claim 11 wherein the inefficiency factor calculated in b.ii) is a multi-tenant inefficiency factor for use in calculating the space required when the user will have to share a floor of the building with another tenant.

14. The system of claim 11 wherein the processor also uses the software to provide a comparison of the target rental rate of the building to relative values of a number of other buildings having differing inefficiency factor.

15. The system of claim 11 wherein the processor also uses the software to calculate a second target rental rate for a hypothetical building by increasing the inefficiency ratio by a predetermined amount to obtain a hypothetical inefficiency ratio and repeating b.iii) through b.v) using the hypothetical inefficiency ratio.

16. The system of claim 11 wherein the rent budget is an annual rent budget.

17. The system of claim 11 wherein the processor and memory storage are included in a server and the display is included in a user workstation that communicates with the server through a network.

18. The system of claim 11 wherein the processor, memory storage and display are included in a standalone computer.

19. A non-transitory machine-readable medium on which has been prerecorded a computer program which, when executed by a processor, performs the following steps:
   a. receives input data relating to a building single tenant loss factor, a building multi-tenant loss factor, a landlord's Stated rentable square feet for a space in the building, losses in actual usable space in an office building and a rental rate for the building;
   b. calculates an inefficiency factor for the building based on' the data relating to losses in actual usable space in the building by
   A. calculating an inaccurate measurement loss based on a difference between the landlord's stated rentable square footage for a space in the building and a rentable square footage for the space in the building calculated using standards;
   B. calculating a column loss based upon areas of column encumbering the space in the building if a column is present in the space of the, building;
   C. calculating an unusual building shape loss based on a building side that is not flat if a side of the building is not flat or is at angle other than approximately 90° with respect to an adjacent wall;
   D. calculating a window line encumbrance loss based on a perimeter of the Space in the building and an encumbrance positioned at the perimeter if an encumbrance is positioned at the perimeter in the space of the building;
   E. calculating an unusual loss that does not fit, into steps A. through D if such an unusual loss is present in the space of the building;
   F. adding the losses of steps A. through E.;
   G. dividing the added losses of step F. by the landlord's stated rentable square footage for a space in the building to calculate a net inefficiency;
   H. calculating the inefficiency factor, based on the net inefficiency and the building single-tenant loss factor or the building multi-tenant loss factor; and
   c. multiplies the rental rate by the inefficiency factor to obtain the relative value of the building.

20. The non-transitory machine-readable medium of claim 19 wherein the processor also divides the relative value of the building by a predetermined constant.

21. The non-transitory machine-readable medium of claim 20 wherein the predetermined constant is a common inefficiency factor.

22. A non-transitory machine-readable medium on which has been prerecorded a computer program which, when executed by a processor, performs the following steps:
   a. receives areas required by the user, a building single tenant loss factor, a building multi-tenant loss factor, a landlord's stated rentable square feet for a space in the building, data relating to losses in actual usable space in an office building and a rent budget for the user;
   b. determines a pure space based on the input areas;
   c. calculates an inefficiency factor for the building based 0r~ the data relating to losses in actual usable space in the building by;
   A. calculating an inaccurate measurement loss based on a difference between the landlord's stated rentable square footage for a space in the building and a rentable square footage for the space in the building calculated using standards;
   B. calculating a column loss based upon areas of column encumbering the space in the building if a column is present in the space of the building;
   C. calculating an unusual building shape loss based on a building side that is not flat if a side of the building is not flat or is at an angle other than approximately 90° with respect to an adjacent wall;
   D. calculating a window line encumbrance loss based on a perimeter of the space in the building and an encumbrance positioned at the perimeter if an encumbrance is positioned at the perimeter in the space of the building;
   E. calculating an unusual loss that does not fit into steps A. through D if such an unusual loss is present in the space of the building;
   F. adding the losses of steps A. through E.;
   G. dividing the added losses of step F. by the landlord's stated rentable square footage for a space in the building to calculate a net inefficiency;
   H. calculating the inefficiency factor based on the net inefficiency and the building single tenant loss factor or the building multi-tenant loss factor;
   d. multiplies the pure space by the inefficiency factor to obtain a building efficiency loss;
   e. adds the building efficiency loss to the pure space to obtain a space required for the user in the building; and
   f. divide the rent budget by the space required for the user in the building to obtain the target rental rate.

* * * * *

UNITED STATES PATENT AND TRADEMARK OFFICE
CERTIFICATE OF CORRECTION

PATENT NO. : 8,799,176 B2
APPLICATION NO. : 12/012554
DATED : August 5, 2014
INVENTOR(S) : Michael J. Walker It is certified that error appears in the above-identified patent and that said Letters Patent is hereby corrected as shown below:

In the Claims

Column 17, claim 1, line 11: add the word --a-- after the phrase "footage for"
Column 17, claim 5, line 48: delete the "," after the phrase "wherein the"
Column 18, claim 11, line 1: delete the "-" between the words "rental" and "rate"
Column 18, claim 11, line 6: replace the word "floss" with the word "loss"
Column 18, claim 11, line 20: delete the "-" between the words "calculated" and "using"
Column 18, claim 11, line 36: replace the ":" at the end of the line with ";"
Column 18, claim 14, line 63: replace the word "factor" with the word "factors"
Column 18, claim 19, line 17: replace the word "Stated" with the word "stated"
Column 19, claim 19, line 21: delete the """ after the word "on"
Column 19, claim 19, line 22: insert a --;-- after the word "by"
Column 19, claim 19, line 30: delete the "," after the phrase "of the"
Column 19, claim 19, line 36: replace the word "Space" with the word "space"
Column 19, claim 19, line 39: delete the "," after the word "fit"
Column 19, claim 19, lines 40-42: reformat the text starting at the word "through" on line 40 and ending with the word "building;" on line 42 to make continuous text
Column 19, claim 19, line 47: delete the "," after the word "factor"
Column 20, claim 22, line 17: replace the word "0r~" with the word "on"
Column 20, claim 22, line 42: insert a -- - -- between the words "single" and "tenant"

Signed and Sealed this
Third Day of March, 2015

Michelle K. Lee
*Deputy Director of the United States Patent and Trademark Office*